March 13, 1956 E. SCHLUETER 2,738,211
LOCKABLE HOOK TYPE FASTENER
Filed March 26, 1952 2 Sheets-Sheet 1

INVENTOR
ERNEST SCHLUETER
BY H. M. Kilpatrick
ATTORNEY

March 13, 1956  E. SCHLUETER  2,738,211
LOCKABLE HOOK TYPE FASTENER
Filed March 26, 1952  2 Sheets-Sheet 2

INVENTOR
ERNEST SCHLUETER
BY
ATTORNEY

United States Patent Office 2,738,211
Patented Mar. 13, 1956

2,738,211

LOCKABLE HOOK TYPE FASTENER

Ernest Schlueter, Troy, N. Y.

Application March 26, 1952, Serial No. 278,545

28 Claims. (Cl. 292—111)

This invention relates to fastening devices and butt joint fasteners, and to fasteners for fastening together adjacent structures and more particularly to fasteners for locking or fastening together adjacent panels of portable houses, large packing cases, doors, or other structures, though it is noted that in some of the claims the invention is not limited to securing panels together.

Objects of the invention are to provide an improved positively operating fastening device of this kind which will draw together structures which are a distance apart and then with great force draw and secure them tightly together in a weatherproof manner.

Other objects of the invention are to provide an improved fastener of this kind which will hold the structures tightly together without danger of accidental release, but which may be easily operated to release the structures when desired.

Additional objects of the invention are to effect simplicity and efficiency in such fasteners and to provide an extremely simple fastener of this kind which is convenient, speedy, durable, positive and reliable in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with an improved fastener comprising adjacently open cam and detent housings having a keeper bolt across the detent housing and an eccentric cam member rotatable in the cam housing comprising eccentric cams.

Hook members having bearing openings received on the cams are joined at the outer end to form an end hook opening toward said bolt, and adapted to hook on the bolt. An L-shaped latch pivoted at its elbow part between the hook members near the cam has a long arm movable into the hook opening and a short arm having a holding connection with the cam member for controlling the movements of the latch and hook member as the cam member is rotated.

In the accompanying drawing showing, by way of example, one of many possible embodiments of the invention, Fig. 1 is a fragmental side elevation, partly broken away and partly in section showing the fastener unlocked and the hook members completely housed;

Figure 1:
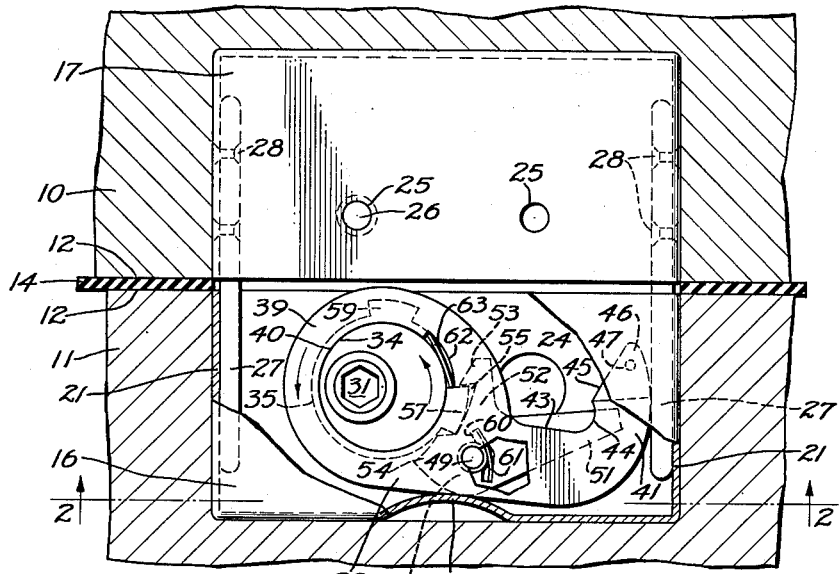
Figure 3:
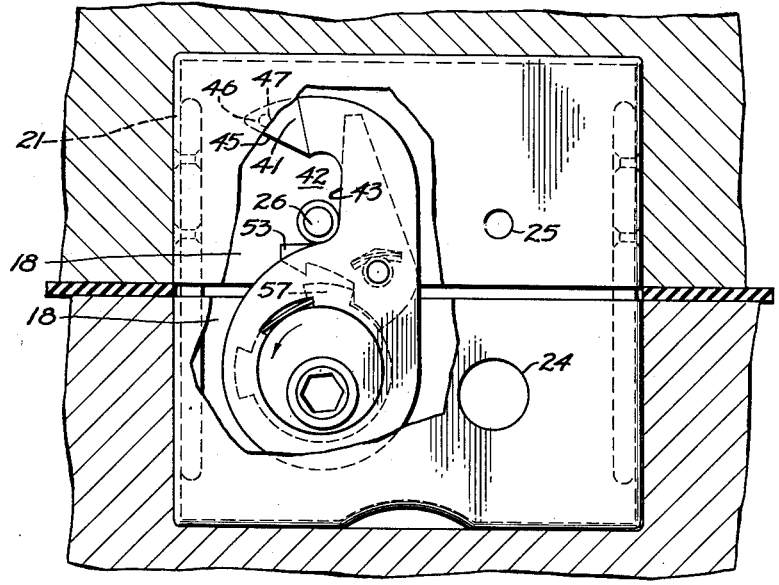
Fig. 3 is a fragmental side elevation partly broken away and partly in section, showing the hook ready to hook on the bolt.
Figure 5:
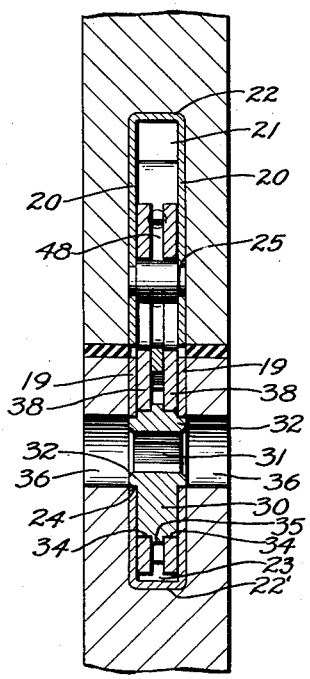
Fig. 5 is a sectional view on the line 5—5 of Fig. 4.

My herein described butt-joint hook fastener is useful for fastening together sliding doors, parts of portable houses, packing cases or other structures such as two panels 10, 11 having substantially abutting edge faces 12 between which a gasket 14 may be disposed. Said fastener comprises elongated cam and detent housings 16, 17 mortised in the abutting faces of the respective panels, said housings having adjacent open portions 18 (Fig. 3) at said faces. The housings comprise parallel side walls 19, 20 (Fig. 5) parallel to the broad faces of the panels, and narrow end walls 21 and back walls 22, 22'. At the mid part of the inner margin of the cam housing, side walls 19, and back walls 22' are pressed inwardly to form an inner stop 23 (Fig. 1).

The side walls 19 of the cam housing are provided with pairs of axially aligned openings 24 disposed about halfway between the middle and the ends of said housing. The side walls 20 of the detent housing are provided with pairs of axially aligned openings 25 disposed about halfway between the middle and the ends of said housing. The openings 25 in the detent housing being keeper openings and disposed nearer said open portion 18. A detent keeper bolt 26 is riveted or otherwise secured in one alined pair of the keeper openings 25. Guide bars 27 secured as by rivets 28 to the end walls of one of the housings slidably engage the end walls of the other housing for guiding the housings into abutting relation. These guide bars may be omitted if desired.

The alined openings 24 in the side walls of the cam housing are bearing openings. An eccentric cam member 30 (Fig. 5) is provided therethrough near one edge with a tool or wrench receiving opening 31 of angular cross-section surrounded at the ends by bosses 32 disposed in the alined bearing openings 24 nearest the keeper bolt 26. Said cam member is formed at opposite faces with coaxial eccentric cams 34 (Figs 1 and 5) adjacent to the housing side walls, and a rib 35 slightly projecting peripherally from the cams. Openings 36 in the panels give access to the opening 31.

Figure 2:
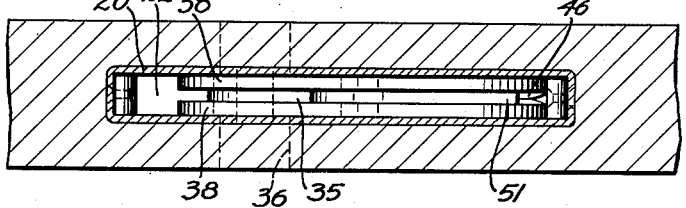
Fig. 2 is a fragmental sectional view taken on the line 2—2 of Fig. 1.

A pair of spaced registering hook members 38 (Fig. 1) having large inner bearing ends 39 frictionally received between the said rib 35 and adjacnt side walls 19 are provided with large bearing openings 40 frictionally received on the cams. The outer ends of the hook member 38 have the form of a hook 41 pointing and opening toward the detent housing when the hook member is housed in the cam housing, the hook opening 42 (Fig. 3) having a rear edge 43 approximately radial to the opening 31, a seat 44 adjacent to said edge and an edge cam face 45 joining and inclined outwardly from the seat and hook opening. The extreme free ends 46 of the members at the hook are drawn together as shown in Fig. 2 and held by a rivet 47 (Fig. 1) to form the locking hook 41 leaving a space 48 (Fig. 5) between the members 38 except at said free ends.

Figure 4:
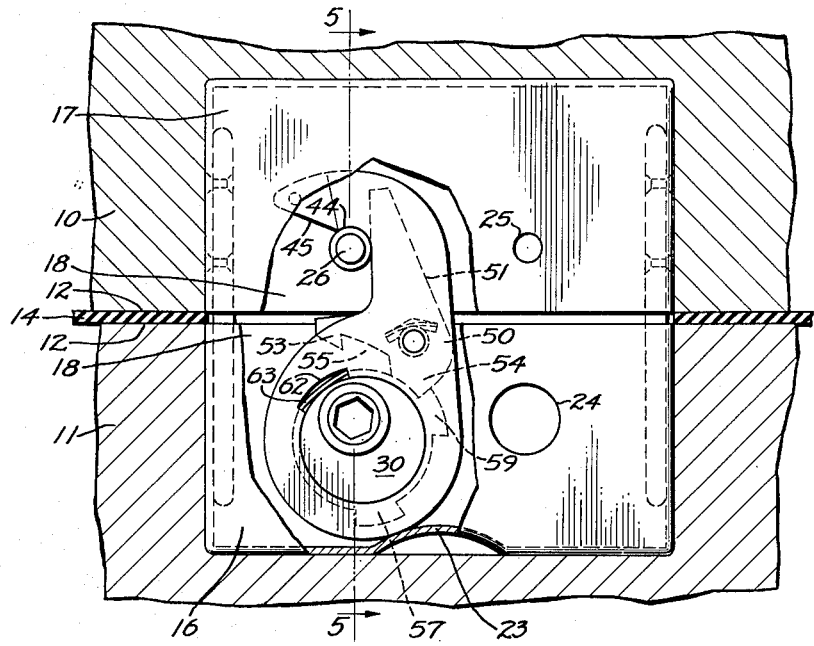
Fig. 4 is a view similar to Fig. 3 showing the hook in locking position.

A pivot pin 49 (Fig. 1) secured transversely to and between the hook members 38 near the cams more rearward than the closed back edge 43 of the hook opening, pivotally receives an L-shaped latch 50 between said members 38 and pivoted at its elbow part on said pin and having a long arm 51 movable into and from the hook opening 42 and across said seat 44. Said L-shaped latch also comprises a short arm 52 disposable approximately circumferentially of the rib 35 and provided at its free end with a forwardly beveled and rearwardly slightly undercut latch hook 53 and a rear lug 54 adjacent to the disk, forming therebetween an intermediate recess 55 opening adjacent to the rib. An undercut actuating lug 57 substantially on the most eccentric part of the rib 35 is engageable in said recess 55 when the hook members are against said inner stop 23 of the detent housing and said long arm 51 is in the hook opening, whereby a wrench in said opening 31 may rotate the member 30 and cams 34 in the direction of the arrow of Figs. 1 and 3, to cause the actuating lug 57 to engage the undercut part of the latch hook 53 to carry the locking hook opening 42 (Fig. 3) to receive, or to cause the cam face 45 to engage and the opening 42 to receive, the keeper bolt 26 and to bring the latch long arm 51 into engagement with the keeper bolt, whereby further rotation of the member 30 and cams 35 will cause the keeper bolt to press back the long arm 51 into the space 48 between the members 38 and withdraw the latch hook 53 from the actuating lug 57 to allow further rotation of the cams 34, whereupon said edge 43 of the locking hook opening is engaged and held by the keeper bolt while the cams continue to rotate until the most eccentric parts of the cams pass to a locking position slightly beyond the dead center point most remote from the keeper bolt as in Fig. 4, the keeper bolt being such distance from the cams that the seat 44 of the locking hook receives the keeper bolt and draws the panel members tightly together.

An unlatching lug 59 is provided on the rib 35 in position to engage the rear lug 54 of the latch, when the cams pass to said locking position, to stop the cams in said locking position and to insure that the long arm 51 is in said space between the hook members and that the latch hook 53 is away from the path of the actuating lug 57, whereupon to unlock the fastener, the cams and member 30 may be rotated in the direction opposite to the arrow of Fig. 1, to move the seat 44 from the keeper bolt and carry the hook members to contact with the said inner stop 23, as in Fig. 1, whereupon further rotation of the cams in said direction causes the actuating lug 57 to engage said rear lug 54 of the latch to move the long arm 51 into the hook opening and across said seat 44, as in Fig. 1.

The L-shaped latch 50 may be provided adjacent to the pivot pin 49 with an approximately arcuate approximately tangential slot 60 (Fig. 1) having its concaved side adjacent to and open to the pin 49, said slot receiving a spring rod 61 pressing outwardly on the ends of the slot wall and intermediately on the pin to insure that the latch shall always be frictionally held against looseness. Also one of the hook members 38 may be provided with an arcuate slot 62 peripherally communicating with the large opening 40 and receiving a spring rod 63 pressing outwardly on the ends of the slot wall and intermediately pressing on the cam 34 to insure that the hook members shall always be frictionally held against looseness on the cams.

The empty openings 24, 25 are used to receive the boss 32 and keeper bolt 26 to convert the fastener from left hand to right hand operation or vice versa as the case may be.

This fastening device is found to be of very strong rigid construction capable of exerting a pull on the panels of more than 7,000 pounds.

I claim as my invention:

1. In combination, a rotary eccentric cam; a hook member received on the cam and having a hook movable to receive a keeper; a device to lock the hook member on the cam when the hook is most remote from the center of rotation of the cam; and means operative by the keeper when the hook moves to receive the keeper to unlock the hook member from the cam to allow further rotation of the cam to cause the hook to draw the keeper toward the center of rotation of the cam.

2. A combination as in claim 1 comprising means to cause said device to lock with the cam when the hook member is stopped remote from the keeper.

3. A combination as in claim 1 comprising means to maintain said device in full releasing condition when the cam has thus drawn the keeper; and means to cause said device to lock with the cam when the hook member is stopped remote from the keeper.

4. In combination a keeper; a rotary eccentric cam; a hook member having a bearing opening receiving the cam, and a hook opening toward the keeper; a device on the hook member near the cam cooperating with the cam to lock the hook member on the cam when the hook is remote from the center of rotation of the cam; said device being positioned and constructed to engage the keeper when the hook receives the keeper and move the device to release the cam from the hook member and allow further rotation of the cam to cause the hook to draw the keeper toward the cam; means on the cam to engage said device when the cam has drawn the keeper, to position the device in full releasing position; and cooperating means on the device and cam to interengage and cause the device to lock with the cam when the hook member is stopped with the hook remote from the center of rotation of the cam.

5. In combination a keeper bolt; a rotary cam member comprising an eccentric cam; a hook member having bearing openings receiving the cam, and an outer end hook opening toward the keeper bolt; a latch pivoted on the hook member near the cam and engageable with the keeper bolt when received in the hook opening and having parts cooperating with the cam member disposable in a locking position to lock the hook member on the cam member when the hook is most remote from the center of rotation of the cam member; whereupon rotation of the cam member moves the hook to receive the bolt and cause the latch to engage the bolt and move the latch to releasing position to release the cam member; whereupon further rotation of the cam member will cause the hook to draw the bolt toward the cam; means on the cam member to engage said latch when the cam has thus drawn the bolt, to position the latch in said released position; a stop to stop the hook member remote from the bolt; and cooperating means on the latch and cam member to interengage and cause the latch to lock with the cam member when the hook member is stopped by said stop.

6. In combination, a rotary eccentric cam member provided near one edge with a tool receiving opening of angular cross-section; said member comprising coaxial eccentric cams, and a projecting peripheral rib between the cams; and hook members engaging opposite sides of the rib and provided with openings received on the cams, the hook members being formed into an outer end hook.

7. A fastener comprising a cam housing having spaced side walls; the cam housing side walls being provided with coaxial bearing openings; an eccentric cam member provided near one edge with a tool receiving opening of angular cross-section surrounded by bosses in the bearing openings; said member comprising coaxial eccentric cams engaging the side walls, and a projecting peripheral rib between the cams; and hook members between the rib and side walls and provided with openings received on the cams, and forming an outer end hook.

8. In combination, an eccentric cam member comprising coaxial spaced eccentric cams and a projecting rib therebetween; a pair of spaced registering hook members having large inner bearing ends frictionally received on the side faces of the rib and provided with large bearing openings frictionally received on the cams; the outer ends of the hook members having the form of a hook having a hook opening, the hook opening having a rear edge approximately radial to the cam member, and a seat adjacent to said edge and a cam face inclined outwardly from the seat and facing the hook opening; whereby said hook member may rotate to cause the hook to pivot and then to draw the hook toward the cam; the extreme free ends of the hook members at the hook being drawn and riveted together forming the hook and leaving a space between the members except at said free ends.

9. In combination, a keeper bolt; a cam member comprising an eccentric cam; a hook member having an opening rotatively receiving the cam, and an opening faced toward and adapted to receive the bolt; and latch means pivoted on the hook member and engaging the cam member to lock the hook member thereon; said latch means having a part in the hook member opening engageable with the bolt, when received by the hook member opening, to move the latch means to disengage and release the cam from the hook member, to allow the cam to continue rotation to draw the bolt toward the cam.

10. In combination a keeper bolt; a cam member comprising an eccentric cam; a hook member having an opening rotatively receiving the cam, and an outer end hook opening toward the keeper bolt; a latch pivoted on the hook member and having a long arm movable into the hook opening and a short arm adjacent to the cam member when the long arm is in the hook opening and having a recess near the cam member; an actuating lug on the cam member at the eccentric part of the cam and engageable in said recess when the long arm is in the hook opening; whereby said cam member may rotate to cause the hook to receive the bolt and the long arm to engage the bolt and move from the hook opening and move the recess from the actuating lug.

11. In combination a keeper bolt; an eccentric cam member comprising an eccentric cam; a hook member having an opening receiving the cam and an outer end hook opening toward and adapted to receive the keeper bolt and having a closed back edge; a pivot pin secured on the hook member near the cam and more rearward than the closed back edge of the hook opening; an L-shaped latch on said hook member and pivoted at its elbow part on said pin and having a long arm movable into and rearwardly from the hook opening and engageable with the keeper bolt, and a short arm disposable approximately circumferentially of the cam member and provided with a forwardly beveled and rearwardly slightly undercut latch hook and a rear lug adjacent to the cam member, forming therebetween an intermediate recess opening adjacent to the cam member; and an actuating lug on the most eccentric part of the cam member and disposed in recess when the hook is remote from the bolt.

12. In combination a keeper bolt; an eccentric cam member comprising an eccentric cam and a projecting rib adjacent to the cam; a hook member having an opening received on the cam and an outer end hook opening toward the keeper bolt; a latch pivoted on the hook member and having a long arm movable into the hook opening and a short arm inclined toward said bolt and adjacent to the rib when the long arm is in the hook opening and having an inwardly undercut latch hook and a lug, together forming a recess near the rib; an undercut actuating lug on the most eccentric part of the rib engageable in said recess when the hook member is most remote from the bolt and said long arm is in the hook opening; whereby said cam member may rotate the rib and cam to cause the actuating lug to engage the undercut part of the latch hook to carry the hook member to receive the keeper bolt and to bring the latch long arm into engagement with the keeper bolt, whereby further rotation of the cam will cause the keeper bolt to press back the long arm and move the latch hook from the actuating lug to allow further rotation of the cam to draw the hook and bolt toward the cam.

13. A fastener comprising adjacently open cam and detent housings; a keeper bolt across the detent housing; an eccentric cam member rotary in the cam housing comprising an eccentric cam; a hook member having an opening received on the cam and an end hook opening toward said bolt; an L-shaped latch pivoted at its elbow part near the cam and having a long arm extending into the hook opening and a short arm directed approximately toward said bolt and having a recess near the cam; a lug on the eccentric part of the cam member engageable in said recess when the long arm is in the hook opening; whereupon on further rotation of the cam the hook is engaged and held by the keeper bolt while the cam continues to rotate until the most eccentric part of the cam passes to a locking position slightly beyond the dead center point most remote from the keeper bolt, the keeper bolt being such distance from the cam that the hook receives the keeper bolt and forcibly draws the bolt toward the cam.

14. In combination a keeper bolt; an eccentric cam member comprising an eccentric cam and a rib adjacent thereto; a stop remote from the bolt; a hook member having an opening receiving the cam, and an outer end hook opening toward the keeper bolt; an L-shaped latch pivoted at its elbow part on the hook member near the cam and having a long arm movable into the hook opening and a short arm directed approximately toward said bolt and having a recess near said rib; an actuating lug on the eccentric part of the cam member engageable in said recess when the long arm is in the hook opening; whereby rotation of said cam member may cause the hook and long arm to engage the bolt and move the recess from the actuating lug and allow rotation of the cam to draw the bolt toward the cam.

15. In combination a keeper bolt; an eccentric cam member comprising an eccentric cam; a hook member having an opening receiving the cam, and an outer end hook opening toward the keeper bolt; a latch pivoted on the hook member and locking with the cam member and releasable from the cam member by engagement with the bolt; and friction means engaging with the latch to retard the pivotal movement.

16. In combination a keeper bolt; an eccentric cam member comprising an eccentric cam; a hook member having an opening receiving the cam, and an outer end hook opening toward the keeper bolt; a pivot pin fast on the hook member near the cam and more rearward than the hook opening; a latch pivoted on said pin and having a long arm movable into the hook opening and an arm near the cam when the long arm is in the hook opening, and having a recess near the cam; a lug on the eccentric part of the cam member and engageable in said recess when the long arm is in the hook opening; whereby said member may rotate to cause the hook to receive the bolt and the long arm to engage the bolt and move from the hook opening and move the recess from the actuating lug; said latch having a slot approximately tangential to said pin; and a spring rod in the slot pressing outwardly on the ends of the slot wall and intermediately pressing on the pin, to prevent looseness of the latch.

17. In combination, an eccentric cam; a hook member having a bearing opening receiving the cam and an outer end hook; the hook member being provided with an arcuate slot peripherally communicating with the bearing opening; and a spring rod disposed entirely in said slot and having its ends disposed simultaneously in the respective ends of the slot, the rod pressing outwardly on the ends of the slot wall and intermediately on the cam.

18. In a fastener, the combination of adjacently open housings having end walls and closely spaced side walls; and guide means at all parts entirely closely adjacent to the end walls and at all parts entirely remote from the central parts of the side walls and comprising parallel guide bars secured to the end walls of one of the housings and slidably engaging the end walls of the other housing for guiding the housings into abutting relation.

19. In a fastener, the combination of adjacently open housings having end walls and closely spaced side walls; and guide means at all parts entirely closely adjacent to the end walls and at all parts entirely remote from the central parts of the side walls and comprising parallel guide bars secured to the end walls of one of the housings and slidably engaging the end walls and both immediately adjacent side wall parts of the other housings for guiding the housings into abutting relation.

20. In a fastener, the combination of adjacently open housings having end walls and closely spaced side walls; guide means at all parts entirely closely adjacent to the end walls and at all parts entirely remote from the central parts of the side walls and comprising parallel guide bars secured to the end walls of one of the housings and slidably engaging the end walls of the other housing for guiding the housings into abutting relation; and interengaging fastening devices secured in said housings respectively between and remote from the guide bars and guided by the housings, when guided by the bars, into positions for cooperation of the devices with each other.

21. In a fastener, the combination of adjacently open housings having end walls and closely spaced side walls, the end walls of one housing being alined with the end walls of the other housing; and guide means at all parts entirely closely adjacent to the end walls and at all parts entirely remote from the central parts of the side walls and comprising parallel guide bars secured to the end walls of one of the housings and slidably engaging the end walls and immediately adjacent side wall parts of the other housing for guiding the housings into abutting relation; said guide bars leaving space therebetween for receiving interengaging fastening devices secured in said housings respectively between and remote from the guide bars and guided by the housings, when guided by the bars, into positions for cooperation of the devices with each other.

22. In combination, a rotary eccentric cam; a hook member having a bearing opening receiving the cam, and a hook opening toward a keeper and adapted to move to receive the keeper; a device movably mounted on the hook member near the cam and cooperating with the cam to lock the hook member on the cam when the hook is remote from the center of rotation of the cam; said device being positioned and constructed to have the definite coaction with the keeper of engaging the keeper, when the hook receives the keeper, and moving the device relative to the member to cause the device to release the cam from the hook member and allow further rotation of the cam relative to the member to cause the hook to draw the keeper toward the axis of rotation of the cam; means on the cam to engage said device, when the cam has thus drawn the keeper, to position the device in full releasing position; and cooperating means on the device and cam to interengage and cause the device to lock with the cam when the hook member, being rotated by the cam, is stopped remote from the keeper and the hook is remote from the center of rotation of the cam.

23. In a fastener, the combination of adjacent housings having adjacent open sides, a back wall, end walls and closely spaced side walls, all corresponding walls of the respective housings being in the same plane throughout; the ends of each housing being substantially identically alike, whereby the housing is reversible end-for-end; guide means at all parts entirely adjacent to the end walls, and at all parts entirely remote from the central parts of the side walls and comprising thick parallel guide bars rigidly secured to the inner face of the end walls of one of the housings continuously from the open side to near the back wall and slidably engaging the inner face of the end walls and both immediately adjacent side wall parts of the other housing, continuously from the open side to near the back wall, for guiding the housings into abutting relation, and interengaging fastening devices secured in said housings respectively to the side walls thereof between and remote from the guide bars and guided by the housings, when guided by the bars, into positions for cooperation of the devices with each other.

24. In combination, a rotary cam eccentric to its axis of rotation; an elongated hook member having one end rotatably received on the cam and having at the other end a hook; the hook member being movable to dispose the hook in hooking and released positions; a device to lock the hook member on the cam when the hook is most remote from said axis; and means operative to unlock the hook member from the cam when the hook is moved to hooking position to release the cam from the hook member and allow further rotation of the cam, while the hook is in locking position, to cause the cam to draw the hook toward the axis of rotation of the cam.

25. A combination as in claim 24 comprising means to cause said device to lock with the cam, when the cam has thus drawn the hook, to position the device in full releasing position.

26. A combination as in claim 24 comprising means to cause said device to lock with the cam, when the cam has thus drawn the hook, to position the device in full releasing position; and means to cause the device to lock with the cam when the hook is rotated by the cam and is stopped in released position remote from said hooking position and the center of rotation of the cam.

27. In combination, a rotary eccentric cam eccentric to its axis of rotation; an elongated hook member having at one end a bearing opening received on the cam and at the other end a hook having a mouth; the member being movable to dispose the hook in hooking and released positions; and a device movably mounted on the hook member near the cam and cooperating with the cam to lock the hook member on the cam when the hook is most remote from said axis; said device having a part disposable across the mouth of the hook and positioned and constructed to move the device to unlock from the cam when the hook is moved to hooking position and said part is pushed into the hook far from the mouth of the hook, to release the cam from the hook member and allow further rotation of the cam, while the hook is in locking position, to cause the cam to draw the hook toward the axis of rotation of the cam.

28. A combination as in claim 27 comprising means on the cam to engage said device, when the cam has thus drawn the hook, to position the device in full releasing position; and cooperating means on the device and cam positioned and constructed to interengage and cause the device to lock with the cam when the hook is rotated by the cam and is stopped in released position remote from said hooking position and the center of rotation of the cam.

References Cited in the file of this patent

UNITED STATES PATENTS

| | | |
|---|---|---|
| 1,232,034 | Hick | July 3, 1917 |
| 2,340,864 | Carpenter | Feb. 8, 1944 |
| 2,342,848 | Endter | Feb. 29, 1944 |
| 2,371,386 | Endter | Mar. 13, 1945 |
| 2,378,654 | Pekny | June 19, 1945 |
| 2,486,686 | Schreve | Nov. 1, 1949 |
| 2,581,816 | Schlueter | Jan. 8, 1952 |
| 2,647,287 | Jones | Aug. 4, 1953 |
| 2,676,825 | Ross | Apr. 27, 1954 |

FOREIGN PATENTS

| | | |
|---|---|---|
| 14,626 | Great Britain | June 16, 1897 |
| 16,237 | Great Britain | July 22, 1904 |
| 101,308 | Sweden | Apr. 8, 1941 |